US012283450B2

(12) United States Patent
Greenland et al.

(10) Patent No.: US 12,283,450 B2
(45) Date of Patent: Apr. 22, 2025

(54) X-RAY TUBE WITH INNER-COLLIMATOR

(71) Applicant: Moxtek, Inc., Orem, UT (US)

(72) Inventors: Kasey Otho Greenland, South Jordan, UT (US); Todd S. Parker, Kaysville, UT (US); Rick Steck, West Jordan, UT (US)

(73) Assignee: Moxtek, Inc., Orem, UT (US)

(*) Notice: Subject to any disclaimer, the term of this patent is extended or adjusted under 35 U.S.C. 154(b) by 352 days.

(21) Appl. No.: 18/104,859

(22) Filed: Feb. 2, 2023

(65) Prior Publication Data

US 2023/0282438 A1 Sep. 7, 2023

Related U.S. Application Data

(60) Provisional application No. 63/315,785, filed on Mar. 2, 2022.

(51) Int. Cl.

*H01J 35/18* (2006.01)
*H01J 35/06* (2006.01)

(52) U.S. Cl.

CPC .......... *H01J 35/186* (2019.05); *H01J 35/064* (2019.05); *H01J 35/066* (2019.05)

(58) Field of Classification Search

None

See application file for complete search history.

(56) References Cited

U.S. PATENT DOCUMENTS

| | | | | |
|---|---|---|---|---|
| 9,697,980 | B2 * | 7/2017 | Ogura | H01J 35/16 |
| 11,152,184 | B2 | 10/2021 | Parker et al. | |
| 2019/0272970 | A1 * | 9/2019 | Allen | H05H 9/048 |
| 2022/0406557 | A1 * | 12/2022 | Greenland | H01J 35/186 |

FOREIGN PATENT DOCUMENTS

| | | | | |
|---|---|---|---|---|
| WO | WO-2012077463 | A1 * | 6/2012 | H01J 35/02 |

* cited by examiner

*Primary Examiner* — Edwin C Gunberg

(74) *Attorney, Agent, or Firm* — Thorpe North & Western, LLP

(57) ABSTRACT

An x-ray tube can include an x-ray window sealed to a mount. An inner-collimator can be adjacent to, but not sealed to, the x-ray window. The inner-collimator can be sandwiched between the x-ray window and an insulating-layer. The insulating-layer can span an inner-collimator-aperture of the inner-collimator, forming an isolated cavity at the inner-collimator-aperture. Walls of the cavity can include the x-ray window, the inner-collimator, and the insulating-layer. The x-ray tube can have a light weight, can block x-rays in undesirable directions, and can shape the x-ray beam.

20 Claims, 3 Drawing Sheets

X-RAY TUBE WITH INNER-COLLIMATOR

CLAIM OF PRIORITY

This application claims priority to U.S. Provisional Patent Application No. 63/315,785, filed on Mar. 2, 2022, which is incorporated herein by reference.

FIELD OF THE INVENTION

The present application is relaters to x-ray tubes.

BACKGROUND

X-rays have many uses, including imaging, x-ray-fluorescence analysis, x-ray diffraction analysis, and electrostatic dissipation.

A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (drawings might not be drawn to scale)

Figure 1:
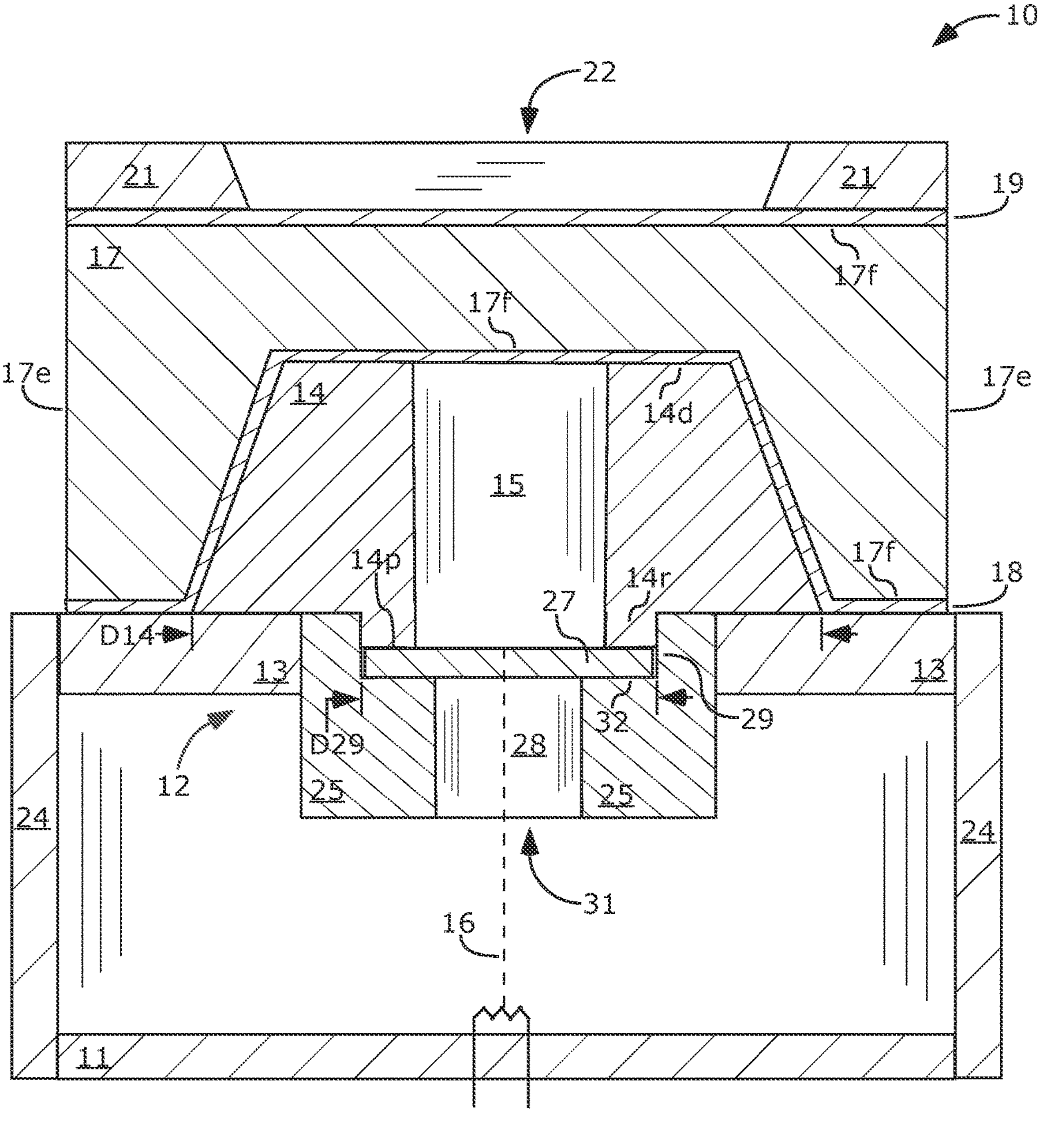

FIG. 1 is a cross-sectional side-view of an x-ray tube 10 including (a) an x-ray window 27 sealed to a mount 25, (b) an inner-collimator 14 next to the x-ray window 27 and the mount 25, and (c) an insulating-layer 17 next to the inner-collimator 14.

Figure 2:
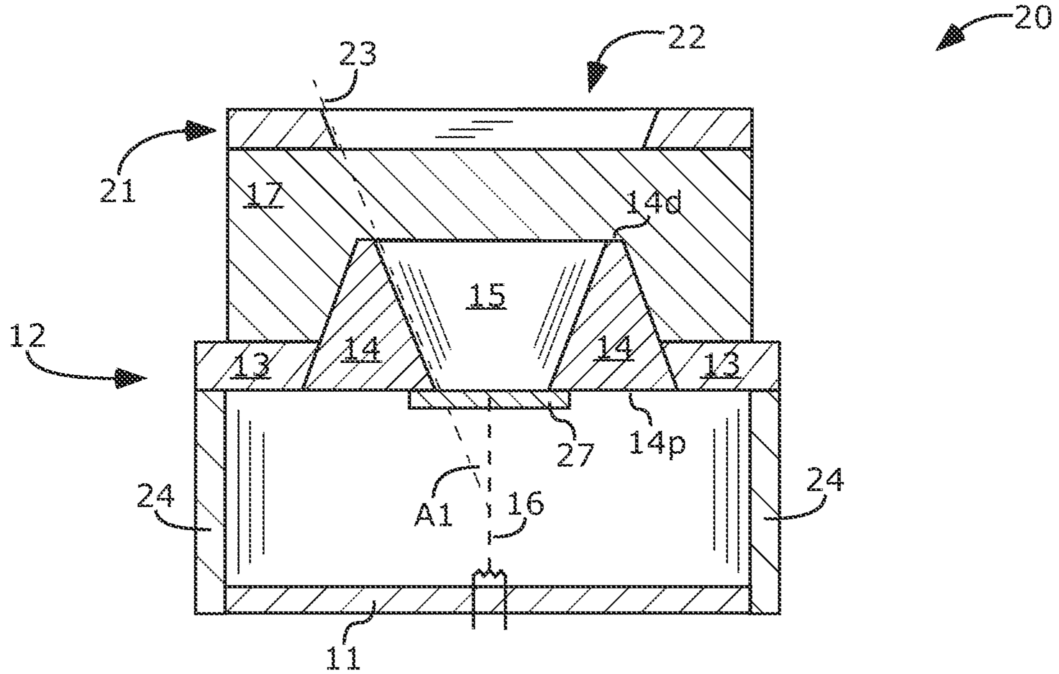

FIG. 2 is a cross-sectional side-view of an x-ray tube 20 including an x-ray window 27, an inner-collimator 14, and an insulating-layer 17.

Figure 3:
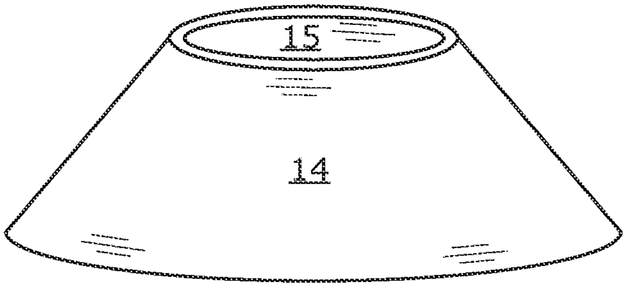

FIG. 3 is a perspective-view of an inner-collimator 14 with an exterior conical-frustum shape.

Figure 4:
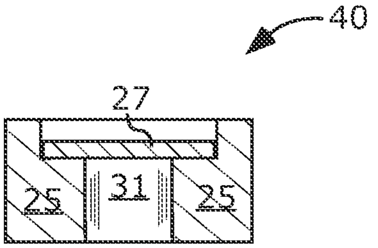

FIG. 4 is a cross-sectional side-view illustrating a step 40 in a method of making an x-ray tube, including sealing an x-ray window 27 across a mount-aperture 31 of a mount 25.

Figure 5:
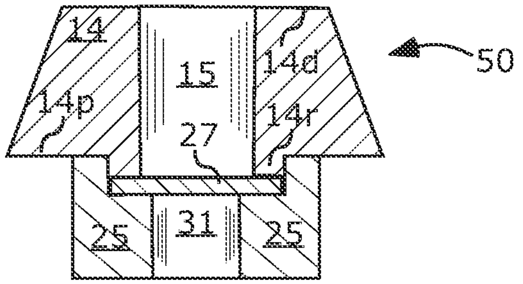

FIG. 5 is a cross-sectional side-view illustrating a step 50 in a method of making an x-ray tube, including placing an inner-collimator 14 next to the x-ray window 27 and the mount 25.

Figure 6:
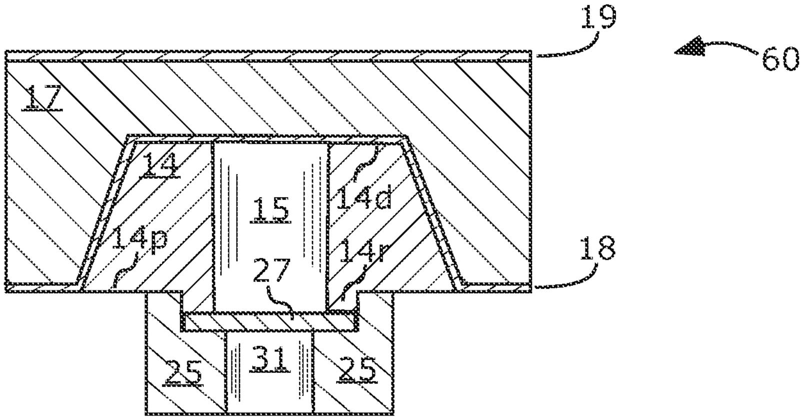

FIG. 6 is a cross-sectional side-view illustrating a step 60 in a method of making an x-ray tube, including placing an insulating-layer 17 on the inner-collimator 14.

Figure 7:
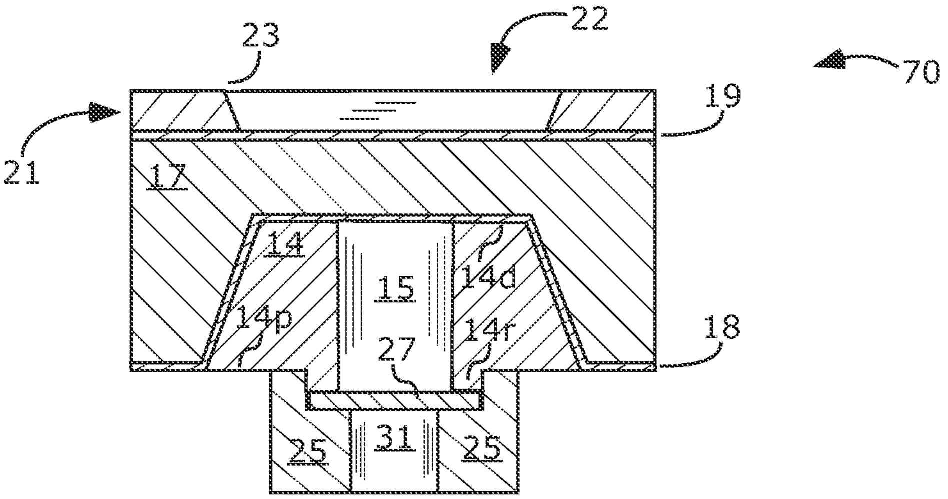

FIG. 7 is a cross-sectional side-view illustrating a step 70 in a method of making an x-ray tube, including placing an outer-collimator 21 on the insulating-layer 17.

REFERENCE NUMBERS IN THE DRAWINGS x-ray tube 10
cathode 11
anode 12
anode-ring 13
inner-collimator 14
distal-end **14*d***
proximal-end **14*p***
ring **14*r***
inner-collimator-aperture 15
axis 16 of the x-ray tube
insulating-layer 17
edge **17*e* of the insulating-layer 17**
pair of opposite faces **17*f* of the insulating-layer 17**
proximal-conducting-layer 18 distal-conducting-layer 19
x-ray tube 20
outer-collimator 21
outer-collimator-aperture 22
wall 23 of the inner-collimator 14
enclosure 24
mount 25
x-ray window 27
narrower-region 28
wider-region 29
mount-aperture 31
flange 32
step 40 in a method of making an x-ray tube
step 50 in a method of making an x-ray tube
step 60 in a method of making an x-ray tube
step 70 in a method of making an x-ray tube
maximum diameter D14 of the inner-collimator 14
diameter D29 of the wider-region 29 of the mount-aperture 31

Definitions

The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "x-ray tube" is not limited to tubular/cylindrical shaped devices. The term "tube" is used because this is the standard term used for x-ray emitting devices.

DETAILED DESCRIPTION

Desirable characteristics of portable x-ray tubes include light weight, blocking of x-rays in undesirable directions, and shaping the x-ray beam. An inner-collimator 14, as described herein, can provide these desirable characteristics.

X-ray tubes 10 and 20 are illustrated in FIGS. 1 and 2. Characteristics of x-ray tubes 10 and 20 can be combined. X-ray tubes 10 and 20 can comprise a cathode 11 and an anode 12 electrically insulated from one another. For example, an enclosure 24 with an internal vacuum can electrically insulate the cathode 11 from the anode 12. The enclosure 24 can be glass or ceramic.

The cathode 11 can be configured (e.g. by voltage differential and a heated filament) to emit electrons, through an internal vacuum of the x-ray tube 10 or 20, towards the anode 12. The anode 12 can be configured (e.g. with a target material) to emit x-rays out of the x-ray tube, through an x-ray window 27, in response to impinging electrons from the cathode 11.

An inner-collimator 14 can be adjacent to the x-ray window 27. The inner-collimator 14 can be used with transmission target x-ray tubes, such as x-ray tubes 10 and 20.

The inner-collimator 14 can be a solid, metal structure. The inner-collimator 14 can be electrically conductive. An inner-collimator-aperture 15 can extend through a center or a core of the inner-collimator 14. The inner-collimator-aperture 15 can be aligned with the x-ray window 27. The inner-collimator-aperture 15 can direct and collimate the x-rays when the x-ray tube is powered during operation.

The inner-collimator 14 can have a proximal-end **14*p* nearest the x-ray window 27 and a distal-end 14*d* farthest from the x-ray window 27. An electrically insulative insulating-layer 17 can be located at the distal-end 14***d* of the inner-collimator 14. The insulating-layer 17 can be made of Ultem® (polyetherimide), The insulating-layer 17 can have characteristics as described in U.S. Pat. No. 11,152,184, which is incorporated herein by reference. The insulating-layer 17 can be machined to desired shape and dimensions. It can be shaped on a lathe or mill.

The insulating-layer 17 can span the inner-collimator-aperture 15. The inner-collimator-aperture 15 can be an enclosed, isolated cavity, Walls of the cavity can include or consist of the x-ray window 27, the inner-collimator 14, and the insulating-layer 17. Part of these walls can be coated with the proximal-conducting-layer 18, described below. The cavity can be isolated from vacuum, from ambient air, or both by the x-ray window 27, the inner-collimator 14, and/or the insulating-layer 17. The inner-collimator 14 can adjoin the insulating-layer 17, as illustrated in FIG. 2.

As illustrated in FIG. 1, the anode 12 can include a mount 25 and the inner-collimator 14. The mount 25, as shown in FIG. 1 and described below, can be added to the features of x-ray tube 20.

The mount 25 can be electrically conductive. The mount 25 can be metallic. The mount can face an internal vacuum of the x-ray tube 10 on one side. The mount 25 can face the inner-collimator 14 at an opposite side. An electrically conductive anode-ring 13 can encircle the mount 25.

The mount 25 can include a mount-aperture 31. The x-ray window 27 can span the mount-aperture 31. The x-ray window 27 can be sealed to the mount 25. The x-ray window 27 can be hermetically-sealed to the mount 25. For example, the x-ray window 27 can be brazed to the mount 25.

The inner-collimator 14 can adjoin the x-ray window 27. There can be an absence of a hermetic seal between the inner-collimator 14 and the x-ray window 27.

The mount-aperture 31 can include a wider-region 29 and a narrower-region 28. A flange 32 can extend between the wider-region 29 and the narrower-region 28. The x-ray window 27 can be sealed to the mount 25 on the flange 32. An outer-ring of the x-ray window 27 can be sandwiched between the mount 25 and the inner-collimator 14.

The inner-collimator 14 can include a ring 14*r* that extends into the wider-region 29 of the mount-aperture 3I The inner-collimator 14 can have a maximum diameter D14 that is larger than a diameter D29 of the wider-region 29 of the mount-aperture 31.

The inner-collimator-aperture 15, the x-ray window 27, and the mount-aperture 31 can be aligned with each other. X-rays can be formed in a target material at the x-ray window 27 when the x-ray tube is powered during operation. These x-rays can be directed outward from the x-ray tube 10 and collimated by walls of the inner-collimator-aperture 15.

The insulating-layer 17 can include a pair of opposite faces 17*f* connected by an edge 17*e*. A proximal-conducting-layer 18 can be located on one of the pair of opposite faces 17*f* The proximal-conducting-layer 18 can completely cover and adjoin one of the pair of opposite faces 17*f*. A distal-conducting-layer 19 can be located on another of the pair of opposite faces 17*f* The distal-conducting-layer 19 can completely cover and adjoin this other of the pair of opposite faces 17*f* The proximal-conducting-layer 18 and the distal-conducting-layer 19 can each be continuous without gaps, holes, open channels, or combinations thereof.

The proximal-conducting-layer 18 and the distal-conducting-layer 19, as shown in FIG. 1 and described below, can be added to the features of x-ray tube 10. The proximal-conducting-layer 18 and the distal-conducting-layer 19 can be removed from x-ray tube 10.

The proximal-conducting-layer 18 and the distal-conducting-layer 19 can be electrically conductive. They can be metal layers, doped carbon, or other conductive material. The proximal-conducting-layer 18 and the distal-conducting-layer 19 can prevent ionization of gas at the pair of opposite faces 17*f* of the insulating-layer 17.

The proximal-conducting-layer 18 can span the inner-collimator-aperture 15. The proximal-conducting-layer 18 can be located between the insulating-layer 17 and the cavity. The proximal-conducting-layer 18 can be located between the inner-collimator 14 and the insulating-layer 17. The proximal-conducting-layer 18 can adjoin the inner-collimator 14, the insulating-layer 17, or both.

The proximal-conducting-layer 18 can adjoin the anode-ring 13. The proximal-conducting-layer 18 can have an outer edge that terminates on a face of the anode-ring 13.

The proximal-conducting-layer 18 and the distal-conducting-layer 19 can be separated from each other by a ring on the edge 17*e* that is free of electrically-conductive material. The entire edge 17*e* can be free of electrically-conductive material.

The inner-collimator-aperture 15 can be free of electrical fields when the x-ray tube is powered during operation. This can be achieved by encircling the inner-collimator-aperture with electrically-conductive materials—the proximal-conducting-layer 18, the anode-ring 13, the mount 25, and the x-ray window 27. The inner-collimator 14 can also be electrically-conductive.

An outer-collimator 21 can be adjacent to the insulating-layer 17 and can be attached to the insulating-layer 17. The outer-collimator 21 can adjoin the distal-conducting-layer 19, as illustrated in FIG. 1. The outer-collimator 21 can adjoin the insulating-layer 17, as illustrated in FIG. 2. The outer-collimator 21 is optional and can be removed from x-ray tube 10 or x-ray tube 20.

The distal-conducting-layer 19 can be sandwiched between the outer-collimator 21 and the insulating-layer 17. The outer-collimator 21 can have an outer-collimator-aperture 22 aligned with the inner-collimator-aperture 15. A shape of the outer-collimator can match an extension of a shape of the inner-collimator. This shape of the outer-collimator 21 can match a shape of x-rays formed by a shape of the inner-collimator 14 when the x-ray tube is powered during operation.

An inner-collimator 14 wall angle A1 is illustrated in FIG. 2. Angle A1 is an angle between a wall 23 of the inner-collimator 14 and an axis 16 of the x-ray tube 10 or 20. The axis 16 of the x-ray tube 10 or 20 extends between a target material at the anode 12 and an electron emitter at the cathode 11. Angle A1 can be selected for desired x-ray beam shape. Example values include $15° \leq A1$, $25° \leq A1$, or $35° \leq A1$; and $A1 \leq 60°$, $A1 \leq 70°$, or $A1 \leq 80°$. The wall angle A1 can be added to the features of x-ray tube 10. The wall angle A1 can be removed from x-ray tube 20.

A shape of an exterior of the inner-collimator 14 can match a shape of an interior of the insulating-layer 17. The exterior of the inner-collimator 14 can include a conical-frustum or partial ovoid shape. The interior of the insulating-layer 17 can include a conical-frustum or partial ovoid shape. The shape of the insulating-layer 17 can mate with the shape of the inner-collimator 14. The conical-frustum shape of the inner-collimator 14 is illustrated in a perspective-view in FIG. 3. The conical-frustum shapes of the insulating-layer 17 and of the inner-collimator 14 are illustrated in cross-sectional side-views in FIGS. 1 and 2.

As illustrated in FIG. 1, the insulating-layer 17 can include a planar-face opposite of the interior conical-frustum shape. The proximal-conducting-layer 18 can be located on the interior conical-frustum shape of the insulating-layer 17, The distal-conducting-layer 19 can be located on the planar-face of the insulating-layer 17.

In any example described herein, x-ray tube components can have the following material composition. At least 50 weight percent, 70 weight percent, or 90 weight percent of the inner-collimator 14 can have an atomic number ≥50 or can be tungsten. The inner-collimator 14 can comprise or be made of a polymer embedded with a high atomic number material (e.g. atomic number ≥50). For example, the inner-collimator 14 can comprise nylon with embedded tungsten. At least 50 weight percent, 70 weight percent, or 90 weight percent of the mount 25 can have an atomic number 50 or can be tungsten. At least 50 weight percent, 70 weight percent, or 90 weight percent of the anode-ring 13 can be lead or can have an atomic number ≥50.

Method

A method of making an x-ray tube can include some or all of the following steps. These steps can be performed in the following order. Some of the steps can be performed, simultaneously unless explicitly noted otherwise in the claims. Components of the x-ray tube can have properties as described above.

The method can comprise some or all of the following steps:

Step 40: Placing an x-ray window 27 across a mount-aperture 31 of a mount 25. See FIG. 4.

Step 50: Placing an inner-collimator 14 next to the x-ray window 27 and the mount 25. See FIG. 5.

Step 60: Placing an electrically insulative insulating-layer 17 on the inner-collimator 14. See FIG. 6.

Step 70: Placing an outer-collimator 21 on the insulating-layer 17. See FIG. 7.

A typical order of performing the steps is step 40, step 50, then step 60. Step 70, if used, is typically performed after step 60.

Another step in the method can be sealing the x-ray window 27 to the mount 25. This step is typically performed between steps 40 and 50 or between steps 50 and 60.

In step 50, the inner-collimator 14 can have an inner-collimator-aperture 15. The inner-collimator-aperture 15 can be aligned with the x-ray window 27 and the mount-aperture 31.

In step 70, the insulating-layer 17 can span the inner-collimator-aperture 15, forming an isolated cavity at the inner-collimator-aperture 15.

The insulating-layer 17 of step 70 can include the proximal-conducting-layer 18, the distal-conducting-layer 19, or both as shown. Alternatively, these layers 18 and 19 can be missing from the insulating-layer 17.

What is claimed is:

1. An x-ray tube comprising:

a cathode and an anode electrically insulated from one another;

the cathode configured to emit electrons, through an internal vacuum of the x-ray tube, towards the anode;

the anode configured to emit x-rays out of the x-ray tube, through an x-ray window, in response to impinging electrons from the cathode;

the anode includes an electrically conductive mount and an electrically conductive inner-collimator;

the mount faces the vacuum on one side and the inner-collimator at an opposite side;

the mount includes a mount-aperture;

the x-ray window spans the mount-aperture and is sealed to the mount;

the inner-collimator includes an inner-collimator-aperture aligned with the x-ray window and the mount-aperture to direct and collimate the x-rays;

the inner-collimator includes a proximal-end nearest the x-ray window and a distal-end farthest from the x-ray window;

an electrically insulative insulating-layer located at the distal-end of the inner-collimator and spanning the inner-collimator-aperture, forming an isolated cavity at the inner-collimator-aperture; and walls of the cavity include the x-ray window, the inner-collimator, and the insulating-layer.

2. The x-ray tube of claim 1, wherein the inner-collimator-aperture is free of electrical fields during operation of the x-ray tube.

3. The x-ray tube of claim 1, wherein 15°≤A1≤70°, where A1 is an angle between a wall of the inner-collimator and an axis of the x-ray tube between a target material at the anode and an electron emitter at the cathode.

4. The x-ray tube of claim 1, further comprising an electrically conductive proximal-conducting-layer on a face of the insulating-layer, spanning the inner-collimator-aperture, located between the inner-collimator and the insulating-laver, and located between the insulating-layer and the cavity.

5. The x-ray tube of claim 4, further comprising:

an electrically conductive anode-ring encircling the mount;

the proximal-conducting-layer adjoining the anode-ring; and the proximal-conducting-layer having an outer edge that terminates on a face of the anode-ring.

6. The x-ray tube of claim 1, wherein:

the mount-aperture includes a wider-region and a narrower-region with a flange extending between the wider-region and the narrower-region;

the x-ray window is sealed to the mount on the flange;

the inner-collimator includes a ring that extends into the wider-region of the mount-aperture; and the inner-collimator has a maximum diameter that is larger than a diameter of the wider-region of the mount-aperture.

7. The x-ray tube of claim 1, further comprising:

the insulating-layer has a pair of opposite faces connected by an edge;

an electrically conductive proximal-conducting-layer is located on one of the pair of opposite faces;

an electrically conductive distal-conducting-layer is located on another of the pair of opposite faces; and the proximal-conducting-layer spans the inner-collimator-aperture of the inner-collimator, is located between and adjoins the insulating-layer and the cavity, and is located between and adjoins the inner-collimator and the insulating-layer.

8. The x-ray tube of claim 7, further comprising:

an outer-collimator adjoining the distal-conducting-layer, the distal-conducting-layer sandwiched between the outer-collimator and the insulating-layer; and the outer-collimator having an outer-collimator-aperture aligned with the inner-collimator-aperture.

9. The x-ray tube of claim 1, further comprising an absence of a hermetic seal between the inner-collimator and the x-ray window.

10. The x-ray tube of claim 1, wherein:
the cavity is enclosed by the x-ray window, the inner-collimator, and the insulating-layer; and
the cavity is isolated from vacuum by the x-ray window and ambient air by the the inner-collimator and the insulating-layer.

11. An x-ray tube comprising:
a cathode and an anode electrically insulated from one another;
the cathode configured to emit electrons towards the anode;
the anode configured to emit x-rays out of the x-ray tube, through an x-ray window, in response to impinging electrons from the cathode;
an inner-collimator adjacent to the x-ray window, the inner-collimator having an inner-collimator-aperture aligned with the x-ray window configured to direct and collimate the x-rays, the inner-collimator having a proximal-end nearest the x-ray window and a distal-end farthest from the x-ray window;
an electrically insulative insulating-layer located at the distal-end of the inner-collimator and spanning the inner-collimator-aperture; and
an electrically conductive proximal-conducting-layer on a face of the insulating-layer, spanning the inner-collimator-aperture, and located between the inner-collimator and the insulating-lager.

12. The x-ray tube of claim 11, wherein 15°≤A1≤70°, where A1 is an angle between a wall of the inner-collimator and an axis of the x-ray tube between a target material at the anode and an electron emitter at the cathode.

13. The x-ray tube of claim 11, further comprising an electrically conductive distal-conducting-layer located on an opposite face from the proximal-conducting-layer.

14. The x-ray tube of claim 13, further comprising:
an outer-collimator adjoining the distal-conducting-layer;
the distal-conducting-layer sandwiched between the outer-collimator and the insulating-layer; and
the outer-collimator having an outer-collimator-aperture aligned with the inner-collimator-aperture.

15. The x-ray tube of claim 14, wherein a shape of the outer-collimator matches an extension of a shape of the inner-collimator.

16. An x-ray tube comprising:
a cathode and an anode electrically insulated from one another;
the cathode configured to emit electrons towards the anode;
the anode configured to emit x-rays out of the x-ray tube, through an x-ray window, in response to impinging electrons from the cathode;
an inner-collimator adjacent to the x-ray window, the inner-collimator having an inner-collimator-aperture, aligned with the x-ray window, configured to direct and collimate the x-rays, the inner-collimator having a proximal-end nearest the x-ray window and a distal-end farthest from the x-ray window;
an electrically insulative insulating-layer located at the distal-end of the inner-collimator and spanning the inner-collimator-aperture; and
15°≤A1≤70°, where A1 is an angle between a wall of the inner-collimator and an axis of the x-ray tube between a target material at the anode and an electron emitter at the cathode.

17. The x-ray tube of claim 16, further comprising:
the insulating-layer having a pair of opposite faces connected by an edge;
an electrically conductive proximal-conducting-layer located on one of the pair of opposite faces;
an electrically conductive distal-conducting-layer located on another of the pair of opposite faces;
the proximal-conducting-layer spans the inner-collimator-aperture and is located between and adjoins the inner-collimator and the insulating-layer.

18. The x-ray tube of claim 17, further comprising:
an outer-collimator adjoining the distal-conducting-layer;
the distal-conducting-layer sandwiched between the outer-collimator and the insulating-layer; and
the outer-collimator having an outer-collimator-aperture aligned with the inner-collimator-aperture.

19. The x-ray tube of claim 18, wherein a shape of the outer-collimator matches an extension of a shape of the inner-collimator.

20. The x-ray tube of claim 16, wherein the inner-collimator has at least 50 weight percent tungsten.

* * * * *